Dec. 6, 1960   J. W. BRAVO ET AL   2,962,825
PORTABLE VIEWING DEVICE
Filed June 9, 1959

INVENTORS
JOEL W. BRAVO
RUDOLPH H. KILONSKY
BY
ATTORNEYS

United States Patent Office 2,962,825
Patented Dec. 6, 1960

2,962,825

PORTABLE VIEWING DEVICE

Joel W. Bravo and Rudolph H. Kilonsky, Binghamton, N.Y., assignors to General Aniline & Film Corporation, New York, N.Y., a corporation of Delaware Filed June 9, 1959, Ser. No. 819,111

4 Claims. (Cl. 40—106.1)

This invention relates to a portable display device and more particularly to a viewer for transparent illustrative material such as photographs, sheet film, X-rays, or the like.

It is the primary object of this invention to provide a compact, portable apparatus which is light in weight and rugged in construction and will accommodate a stack of transparent material which is desired to be viewed or displayed.

It is a particular feature of this invention that the viewing apparatus may easily be folded and carried as a suitcase and set up into viewing position with a minimum of assembly operation.

Another feature of this invention is that the viewing device is provided with guide rings over which a stacked supply of material to be viewed may be arranged and released automatically upon falling into viewing position.

Other objects and features will be apparent from the following description of the invention pointed out in particularity in the appended claims and taken in connection with the accompanying drawing in which Fig. 1 is a perspective view of the apparatus in erected position ready for use:

Figure 1:
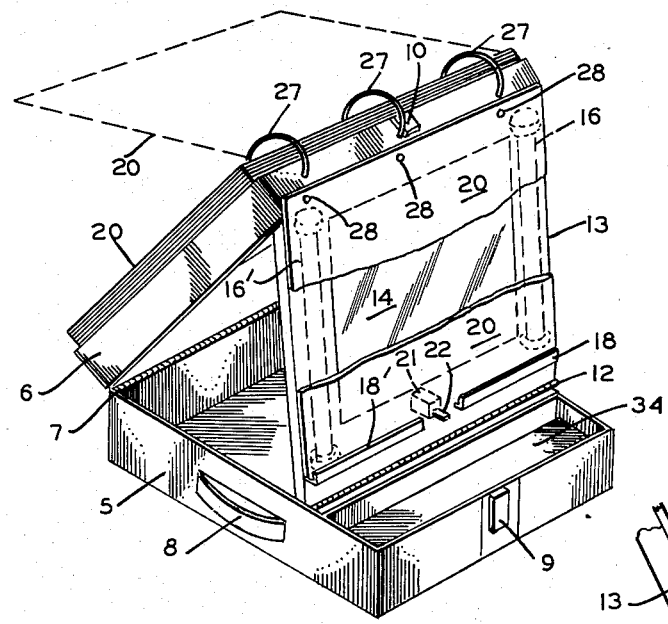
Figure 3:
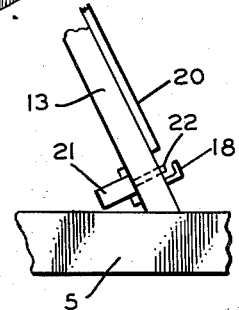
Fig. 3 is a partial side-elevational view showing the operating switch and the slide holding bracket.

Referring to the figures, the viewing apparatus consists of a rectangular casing 5 having a rigid cover 6 hinged to one end thereof as at 7. The construction of the casing 5 is similar to that used in luggage and it is provided with the usual collapsible handle 8 and a lock 9 which cooperates with a catch 10 placed on the cover 6 so as to securely fasten the cover to the casing when the device is to be stored or transported.

Hinged to the casing adjacent its end, opposite to the hinge 6 as indicated at 12, is a rectangular frame 13 which serves as an easel and is provided with a viewing area or window 14 which may be of light-diffusing glass or translucent plastic material. The frame 13 also carries on the back side thereof two fluorescent lights 16 and 16' positioned on opposite sides of the viewing area and extending substantially the full length thereof. The lamps 16 and 16' are shown in dotted outlines in Fig. 1. In the partial view of Fig. 4, the lamp 16 is more fully illustrated. The mounting may be effected in any suitable manner, for example, by clamps attached to the inner face of the frame 13. The lamps, positioned in the manner shown, provide a substantially even distribution of light over the viewing area.

The frame 13 is provided on the front face and adjacent the lower end thereof with supporting brackets 18 and 18' upon which the transparency 20 to be viewed is adapted to rest. Between the brackets 18 and 18' and on the back side of the frame 13 is mounted a micro switch 21, the operating lever of which extends to the front face. The position of this lever is such that a transparency 20 supported on the brackets 18 and 18' will depress the lever 22 and actuate the switch 21. The electrical connection of the latter with the lamps 16 and 16' is not shown for the sake of clarity inasmuch as such a connection is an obvious expedient. Suffice it to say that when a transparency 20 is placed on the supporting bracket 18, the switch is automatically operated to energize the lamps 16 and 16' and maintain them lit as long as the transparency is in the viewing position. When the transparency is removed from the brackets 18 and 18', the lamps 16 and 16' will be extinguished by the switch 21. This is a very useful feature in that upon removal of a transparency, the glaring light will not be bothersome to the observer.

Figure 2:
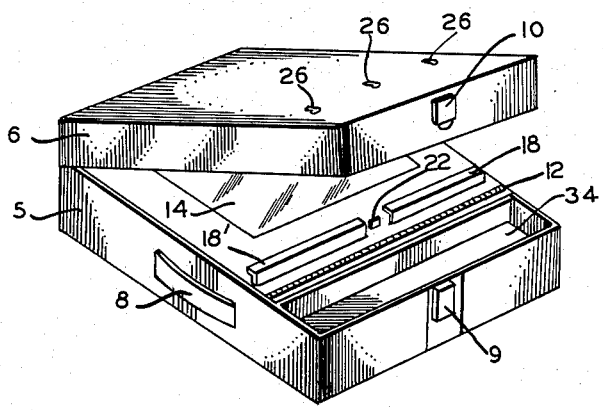
Fig. 2 is a perspective view of the apparatus with the easel-frame folded in and the cover partially closed.

The cover 6, as seen in Fig. 2, has a number of sockets 26, in the shape of a key hole, to accommodate and securely hold the rings 27 which curve downwardly toward the face of the frame 13 and terminate at a sufficient distance therefrom to allow the transparency 20 to slip off automatically into viewing position. For this purpose, the transparencies have a series of perforations 28 which fit over the rings 27 so that a stack of these may be placed on the rings, to rest on the top of cover 6, and held in readiness for subsequent viewing.

Figure 4:
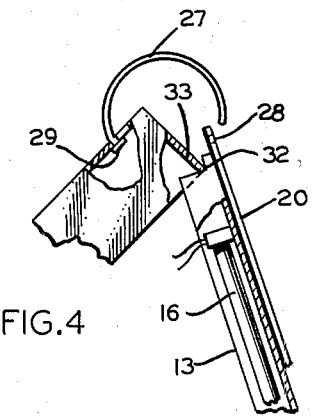
Fig. 4 is a fragmentary view, partially in cross-section, showing the fastening means of the guide rings.

As seen in Fig. 4, the ring 27 has a flattened portion 29 which has a larger diameter sufficient to enter the enlarged portion of the socket 26 and be detained upon sliding down the narrower walls thereof. It is also seen that the side 31 of the frame 13 has a step formation, as indicated at 32, which accommodates the front edge 33 of the cover 6.

The hinge 12 of the frame 13, as can be observed in Figs. 1 and 2, is spaced inwardly from the adjacent end of the casing 5 so as to provide a storage compartment 34, which may be used for keeping accessories such as pencils or other material often necessary for a lecturer to explain what is being viewed on a transparency, and also for storing the guide rings 27 when they are removed from the cover 6.

The assembly of the portable viewer can be effected with a minimum of delay, and in a very simple manner. When collapsed, the frame 13 fits over the casing 5 and is completely hidden by the closed cover 6. For all practical purposes, the device has the appearance of a suitcase. In order to place it in operative position, the cover 6 is opened to a sufficient extent to permit the frame 13 to be lifted and placed under the edge 33 of the cover 6. A rigid structure is thus provided with the frame 13 serving as an easel for the transparencies at a convenient viewing angle. The rings 27 are then inserted in the sockets 26 of cover 6 and the transparencies are assembled in stacked position over the rings 27 to be held thereby against the sloping top of the cover 6. As a transparency is lifted from the stack over the rings 27, it will fall into viewing position, resting on the brackets 18 and 18'. The lamps 16 and 16' are thus energized by the operation of the switch 21 to illuminate the transparency 20 for viewing. The transparency 20 so viewed may then be removed without any difficulty inasmuch as it is clear from the rings 27. The next transparency from the stack may then be placed into viewing position.

We claim:

1. A portable viewing device for transparencies in the form of photographic sheet film comprising a casing having a cover hinged thereto at one end, a frame hinged to said casing near the other end thereof and adapted when erected to engage the edge of said cover thereby serving as an easel upon which a transparency may be placed, said frame having supporting brackets accommodating the lower edge of said transparency and a viewing area defined by a translucent light-diffusing material, illuminating means carried by said frame and arranged to illuminate said viewing area and switching means supported on said frame and adapted to engage the lower edge of said transparency whereby upon placement of said transparency on said easel said illuminating means become energized.

2. A portable viewing device for transparencies in the form of photographic sheet film comprising a casing having a cover hinged thereto at one end, a frame hinged to said casing near the other end thereof and adapted when erected to engage the edge of said cover thereby serving as an easel upon which a transparency may be placed, said frame having a supporting bracket accommodating the lower edge of said transparency and a viewing area defined by a translucent light-diffusing material, illuminating means carried by said frame and arranged to illuminate said viewing area and switching means supported on said frame and adapted to engage the lower edge of said transparency whereby upon p'acement of said transparency on said easel said illuminating means become energized, and guide means attached to said cover and adapted to hold a plurality of transparencies in stacked position for consecutive viewing.

3. A portable viewing device in accordance with claim 2, wherein said guide means comprise a plurality of open-ended rings and attached to said cover, said rings fitting into punched holes in said transparencies, and the open ends of said rings being spaced from said frame at a sufficient distance to permit said transparencies to drop onto said frame.

4. A portable viewer comprising a carrier case, a cover hinged to one end of the case, a frame hinged adjacent the other end of the case but spaced therefrom to provide a storage tray, said frame being of a size to fit into said case and comprising a front panel and sides extending rearwardly therefrom, a translucent rectangular window in said front panel, said panel projecting beyond said sides at the free end of the frame, whereby when said frame is lifted out of the case, the free end of the cover may rest on said sides and against said panel to form an easel-back to support the frame in inclined position on said carrying case, electric lamps carried by said frame on opposite sides of the window and extending the full length of said window, whereby the light from said lamps is substantially uniformly distributed over the window, supporting brackets on said frame positioned adjacent the lower end thereof for supporting a transparency, a switch for controlling said lamps carried by said frame and positioned between said brackets to be automatically actuated by the placing of a transparency on said brackets and to switch off said lamps by the removal of said transparency.

References Cited in the file of this patent

UNITED STATES PATENTS 2,699,619 Fink _____ Jan. 18, 1955

FOREIGN PATENTS 732,506 Great Britain _____ June 22, 1955